(12) United States Patent  
Martin

(10) Patent No.: US 8,087,122 B2
(45) Date of Patent: Jan. 3, 2012

(54) CLEANING SYSTEMS AND METHODS FOR REMOVING FOREIGN SUBSTANCES FROM VISIBLE SURFACES ON VEHICLES

(76) Inventor: Keith Martin, Prince George (CA)

(*) Notice: Subject to any disclaimer, the term of this patent is extended or adjusted under 35 U.S.C. 154(b) by 699 days.

(21) Appl. No.: 12/215,309

(22) Filed: Jun. 25, 2008

(65) Prior Publication Data

US 2009/0001001 A1   Jan. 1, 2009

Related U.S. Application Data

(60) Provisional application No. 60/937,478, filed on Jun. 27, 2007.

(51) Int. Cl.
 *B60S 1/62* (2006.01)
 *B60S 1/46* (2006.01)
(52) U.S. Cl. .......... 15/250.002; 15/319; 15/313
(58) Field of Classification Search .......... 15/250.002, 15/250.001, 250.003, 24, 29, 313, 319; 210/130, 210/105, 284.2, 69, 70, 99
See application file for complete search history.

(56) References Cited

U.S. PATENT DOCUMENTS

| | | | |
|---|---|---|---|
| 1,448,508 A | 3/1923 | Thum | |
| 2,634,166 A * | 4/1953 | Sacchini | 222/16 |
| 3,169,676 A | 2/1965 | Hanselmann | |
| 3,915,385 A * | 10/1975 | Hassinger | 239/284.2 |
| 4,026,468 A | 5/1977 | Tinder et al. | |
| 4,248,383 A | 2/1981 | Savage et al. | |
| 4,323,266 A * | 4/1982 | Savage | 280/6.157 |
| 4,324,363 A | 4/1982 | Rauen, Jr. | |
| 4,390,128 A * | 6/1983 | Fujikawa et al. | 239/284.2 |
| 4,505,001 A | 3/1985 | Fasolino | |
| 5,083,339 A | 1/1992 | Bristow | |
| 5,140,719 A | 8/1992 | Cowan | |
| 5,546,630 A | 8/1996 | Long | |
| 5,657,929 A | 8/1997 | DeWitt et al. | |
| 6,077,361 A | 6/2000 | Glenn | |
| 6,554,210 B2 | 4/2003 | Holt et al. | |
| 7,140,740 B1 * | 11/2006 | Cooper | 359/509 |

* cited by examiner

*Primary Examiner* — Dung Van Nguyen

(74) *Attorney, Agent, or Firm* — Michael R. Schacht; Schacht Law Office, Inc.

(57) ABSTRACT

A cleaning system for a visible surface of a vehicle having a brake system comprising at least one tank of pressurized air, comprising at least one accumulator, a bleed valve assembly, at least one nozzle assembly, and a control valve assembly. Operation of the control valve assembly selectively allows and prevents pressurized air within the accumulator to flow to the at least one nozzle assembly. The bleed valve assembly controls the flow of air from the at least one tank of pressurized air to the at least one accumulator such that flow of pressurized air from the accumulator to the at least one nozzle assembly does not adversely affect operation of the brake system.

13 Claims, 4 Drawing Sheets

CLEANING SYSTEMS AND METHODS FOR REMOVING FOREIGN SUBSTANCES FROM VISIBLE SURFACES ON VEHICLES

RELATED APPLICATIONS

This application claims priority of U.S. Provisional Patent Application Ser. No. 60/937,478 filed Jun. 27, 2007, the contents of which are incorporated herein by reference.

TECHNICAL FIELD

The present invention relates to cleaning systems and methods for removing foreign substances from lighting surfaces on vehicles and, more specifically, to cleaning systems and methods adapted to use pressurized air from the air brake system of the vehicle.

BACKGROUND OF THE INVENTION

Vehicles are often used in environments in which surfaces of the vehicles are at least partly covered with a foreign substance. For example, a logging truck may be used in a wet environment where mud splatters onto the fenders and other surfaces of the vehicle. As another example, a tractor trailer rig may be used in a cold, wet environment in which snow and/or ice can collect on the bumper or grill of the moving vehicle.

For many surfaces, the accumulation of foreign substance is simply an aesthetic and/or aerodynamic performance issue. Problems can arise, however, when foreign substances accumulate on lighting surfaces of a vehicle. For the purposes of this application, the term "lighting surface" refers to a surface, typically transparent or translucent, of a light bulb, lens, or the like that is exposed to the elements and through which light shines. Foreign substances on lighting surfaces can prevent light from passing through the lighting surface.

Cleaning systems for removing foreign substances from lighting surfaces are known; these systems may be mechanical (wipers) or employ pressurized fluids such as air and/or liquids. The present invention relates to cleaning systems for removing foreign substances from lighting surfaces that employ a stream of pressurized fluid to remove foreign substances from lighting surfaces.

While the principles of the present invention may be applied to any vehicle, the present invention is of particular significance in the context of a vehicle that employs an air brake system. As is well-known, a vehicle having an air brake system typically employs an air compressor, air brake assemblies at each wheel, and a tank of pressurized air arranged adjacent to each air brake assembly. Conduits carry pressurized air from the compressor to the air tanks. When the brakes are applied, the pressurized air stored in the tanks actuates the air brake assemblies. While the pressurized air within the air brake system is suitable for use in a cleaning system for removing foreign substances from lighting surfaces, clearly the operation of the air brake system cannot be adversely affected.

The need thus exists for cleaning systems and methods for removing foreign substances from lighting surfaces of a vehicle that employ pressurized air from the air brake system of the vehicle without adversely affecting the operation of the air brake system.

RELATED ART

The following related references were uncovered by a professional patentability search conducted on behalf of the Applicant.

U.S. Pat. No. 5,546,630 to Long discloses a pneumatic cleaning system that directly ties into the pressure tank of a pneumatic braking system. This system does not isolate the cleaning system from the braking system.

U.S. Pat. No. 5,657,929 to DeWitt et al. discloses a system that directs both pressurized air and pressurized liquids from different nozzles onto a surface to be cleaned. This patent discloses the use of an existing auxiliary air source or of a dedicated compressor as the source of pressurized air. This system does not use pressurized air from an existing pneumatic braking system.

U.S. Pat. No. 6,554,210 to Holt et al. discloses a jet assembly through which both pressurized air from one source and pressurized fluid from another source can be sprayed onto a surface to be cleaned.

U.S. Pat. No. 5,140,719 to Cowan discloses a system for directing pressurized air onto a windshield.

U.S. Pat. No. 1,448,508 to Thum, U.S. Pat. No. 3,169,676 to Hanselmann, U.S. Pat. No. 4,026,468 to Tinder, U.S. Pat. No. 4,248,383 to Savage, U.S. Pat. No. 4,324,363 to Rauen, Jr., U.S. Pat. No. 4,505,001 to Fasolino, U.S. Pat. No. 5,083,339 to Bristow, and U.S. Pat. No. 6,077,361 to Glenn all disclose systems that direct liquids or mixtures of liquids and pressurized air onto a surface to be cleaned.

SUMMARY OF THE INVENTION

The present invention may be embodied as a cleaning system for a visible surface of a vehicle having a brake system comprising at least one tank of pressurized air, comprising at least one accumulator, a bleed valve assembly, at least one nozzle assembly, and a control valve assembly. Operation of the control valve assembly selectively allows and prevents pressurized air within the accumulator to flow to the at least one nozzle assembly. The bleed valve assembly controls the flow of air from the at least one tank of pressurized air to the at least one accumulator such that flow of pressurized air from the accumulator to the at least one nozzle assembly does not adversely affect operation of the brake system.

DETAILED DESCRIPTION OF THE INVENTION

The principles of the present invention may be applied in a number of configurations, and three examples of those configurations will be described separately below.

I. First Example

Figure 1:
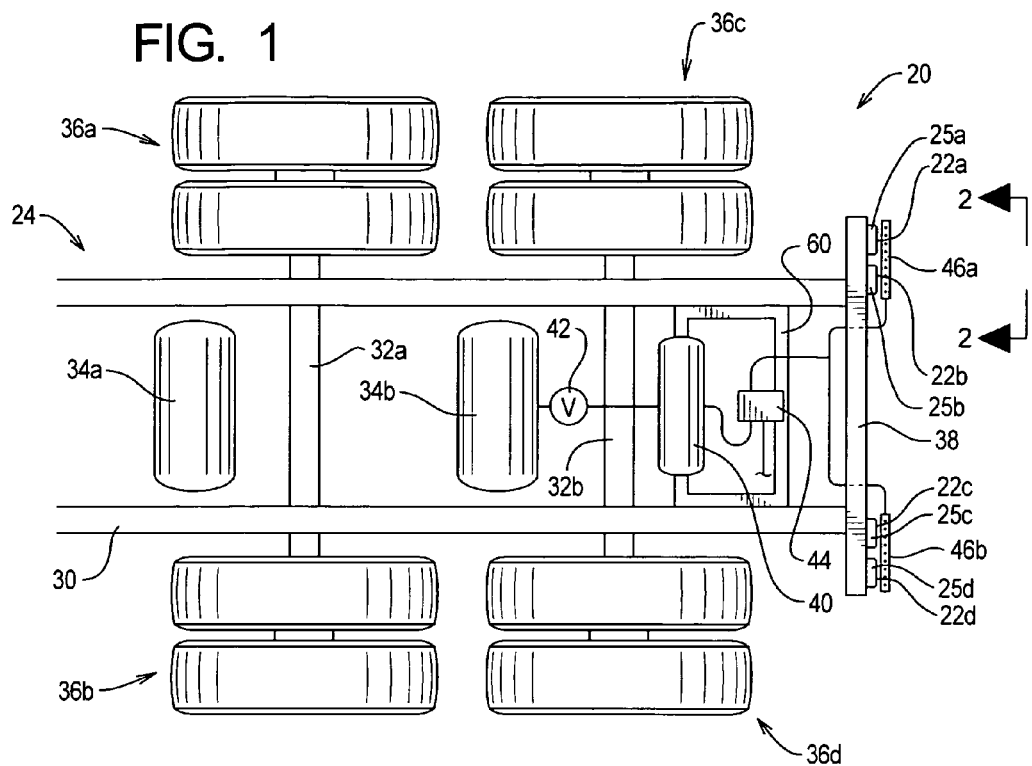
FIG. 1 is a somewhat schematic top plan view of a portion of a vehicle incorporating a first example cleaning system for removing foreign substances from lighting surfaces of the vehicle constructed in accordance with the principles of the present invention.

Referring initially to FIG. 1 of the drawing, depicted therein is a first example cleaning system 20 constructed in accordance with, and embodying, the principles of the present invention. The first example cleaning system 20 is configured to remove foreign substances from first, second, third, and fourth lighting surfaces 22a, 22b, 22c, and 22d of a vehicle 24. In particular, the lighting surfaces 22a, 22b, 22c, and 22d are formed by lenses of light assemblies 25a, 25b, 25c, and 25d forming a part of the vehicle 24.

The vehicle 24 is or may be conventional and will be described herein only to the extent necessary for a complete understanding of the present invention; only a portion of the vehicle 24 is depicted in FIG. 1.

The example vehicle 24 comprises a vehicle frame 30, first and second axles 32a and 32b, first and second air tanks 34a and 34b, and first, second, third, and fourth wheel assemblies 36a, 36b, 36c, and 36d. The vehicle frame 30 is used herein to refer to the rigid frame structure of the vehicle 24. The vehicle 24 further comprises a rear bumper structure 38, and the example light assemblies 25 are mounted to the bumper structure 38.

The air tanks 34 form part of an air brake system (not shown in its entirety) for inhibiting rotation of the wheel assemblies 36. The air brake system is or may be conventional and will not be described herein beyond that extent necessary for a complete understanding of the present invention.

Figure 3:
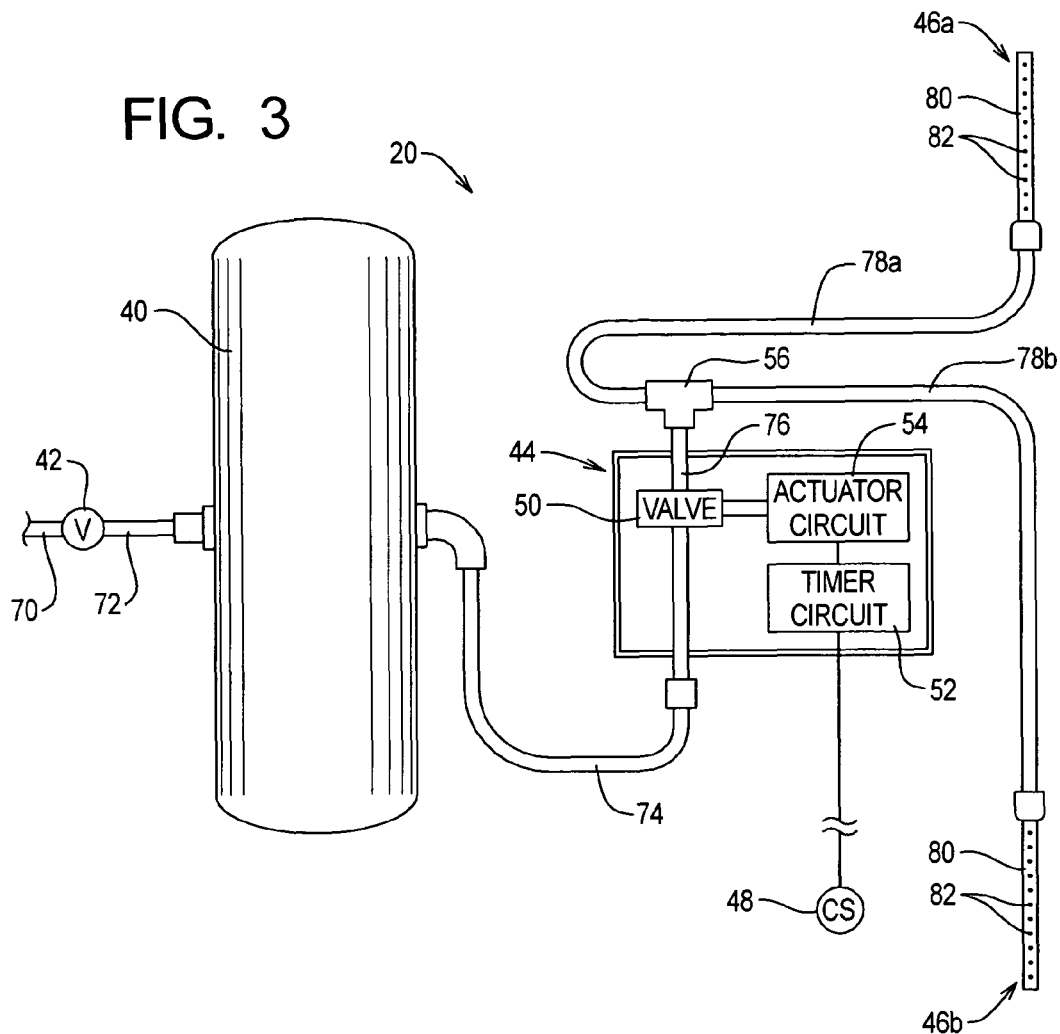
FIG. 3 is a schematic illustration of the first example cleaning system.

As shown in FIGS. 1 and 3, the first example cleaning system 20 comprises an accumulator 40, a bleed valve assembly 42, a control valve assembly 44, first and second nozzle assemblies 46a and 46b, and a control switch 48 (FIG. 3). The accumulator 40 is operatively connected to the second air tank 34b through the bleed valve assembly 42, while the accumulator 40 is operatively connected to the nozzle assemblies 46a and 46b through the control valve assembly 44. The bleed valve assembly 42 is a regulated valve that defines a predetermined minimum pressure value as will be described in detail below.

FIG. 3 also shows that the control valve assembly 44 comprises a valve 50, a timer relay 52, and an actuator 54. The valve 50 is a mechanical component that operates in an OPEN state or a CLOSED state; connected as shown in FIG. 3, the valve 50 allows fluid flow between the accumulator 40 and the nozzle assemblies 46 when in the OPEN state and prevents such fluid flow when in the CLOSED state.

The timer relay 52 is an electrical component that, after a first delay period after receipt of an input signal, generates a timer output signal for a second delay period. In the example cleaning system 20, the duration of the delay periods are settable. In one example, the timer output signal is normally in a LOW state; when the timer relay 52 is triggered by the input signal, after the first delay period the timer relay 52 causes the timer output signal to go into a HIGH state for a the second delay period.

The example actuator 54 is an electro-mechanical component that, when connected between the timer relay 52 and the valve 50 as shown in FIG. 3, places the valve 50 in either the OPEN state or the CLOSED state depending upon the state of the timer output signal. In the example described herein, the actuator 54 places the valve 50 in the CLOSED state when the timer output signal is in the LOW state and places the valve 50 in the OPEN state for as long as the timer output signal is in the HIGH state.

FIG. 3 also shows that the control switch 48 is operatively connected to the control valve assembly 44. The position of the control switch 48 determines whether the control valve assembly 44 allows fluid flow from the accumulator 40 to the nozzle assemblies 46. In particular, the example control switch 48 is connected as the input to the timer relay 52 to generate the input signal in response to which the timer relay 52 generates the timer output signal. In one example, the control switch 48 is a momentary switch that, when operated, generates a pulse. In this case, the control switch 48 is a dedicated switch under control of an operator of the vehicle 24. Preferably, however, the control switch 48 is tied to or forms a part of an ignition circuit of the vehicle 24. In this preferred case, the control switch 48 generates control signal when the vehicle ignition circuit is in its "ON" position.

The example timer relay 52 contains first and second separate timer circuits. First and second delay periods are associated with the first and second timer circuits, respectively. Upon receiving the control signal generated by the control switch 48, the timer relay 52 generates waits for the first time period and then generates the timer output signal in the HIGH state for the second delay period. For as long as the control switch 48 is "ON" (generates the control signal), at the end of every first delay period the timer relay 52 generates the timer output signal in the HIGH state for the second delay period.

FIG. 3 further shows that the control valve assembly 44 is connected to a T-fitting 56 that allows fluid communication between the actuator 54 and the first and second nozzle assemblies 46a and 46b.

Figure 2:
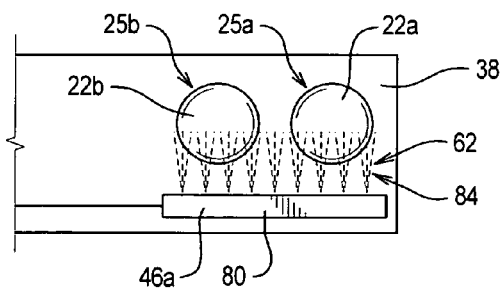
FIG. 2 is a rear elevation view of a nozzle portion of the first example cleaning system.

FIG. 1 illustrates that example cleaning system 20 further comprises a mounting frame 60 that is rigidly connected to the vehicle frame 30. The accumulator 40 and control valve assembly 44 are rigidly attached to the mounting frame 60. FIGS. 1 and 2 illustrate that the first and second nozzle assemblies 46 are rigidly connected to the vehicle bumper 38 such that fluid 62 exiting then nozzle assemblies 46 is directed at the lighting surfaces 22.

As perhaps best shown with reference to FIG. 3, the example cleaning system 20 comprises a number of conduits to connect the various components described above in a conventional manner. In particular, a first conduit 70 is connected between the air tank 34b and the bleed valve assembly 42. A second conduit 72 is connected between the bleed valve assembly 42 and the accumulator 40. A third conduit 74 is connected between the accumulator 40 and the control valve 50. A fourth conduit 76 is connected between the control valve 50 and the T-fitting 56. Fifth and sixth conduits 78a and 78b are connected between the T-fitting 56 and the first and second nozzle assemblies 46a and 46b, respectively.

The conduits 70-78 all are or may be conventional piping with associated fittings, seals, and the like capable of conveying pressurized air as discussed herein. In the example system 20, the first and second conduits 70 and 72 are ¼" lines such as pipes or hoses, the third conduit 74 is a ¾" line, and the fourth, fifth, and sixth conduits 76, 78a, and 78b are ½" lines such as pipes or hoses.

The example cleaning system 20 operates basically as follows. When the ignition circuit of the vehicle is placed in the "ON" condition, the brake system operates in a normal manner. During normal operation of the brake system, the air tanks 34a and 34b fill up with pressurized air.

Once the pressure within the air tanks 34a and 34b is above a predetermined minimum pressure level, the bleed valve assembly 42 allows air to flow from the second air tank 34b to the accumulator 40. The bleed valve assembly 42 closes if the pressure within the air tanks 34a and 34b falls below the predetermined minimum pressure level. In the example system 20, the predetermined minimum pressure value is approximately 80 lbs but in any event is within a range of 80-90 lbs. In addition, the bleed valve assembly 42 and first and second conduits 70 and 72 are sized and dimensioned to allow only a small amount of air flow between the air tank 34b and the accumulator 40.

Once the accumulator 40 is filled with pressurized air, the accumulator 40 stores the pressurized air until the cleaning system 20 is operated. When the ignition system is turned on, the control switch 48 is placed in the "ON" position. The control switch 48 triggers the timer circuit 52; after the first delay period, the timer circuit 52 causes the actuator circuit 54 to open the valve 50 for the second delay period. This process is repeated for as long as the switch 48 is on.

When the valve 50 is open, pressurized air flows from the accumulator 40 to the T-fitting 56 and through the T-fitting 56 to the first and second nozzle assemblies 46a and 46b. As perhaps best shown by FIGS. 2 and 3, the nozzle assemblies 46a and 46b each comprise a nozzle body 80 in which are formed a number of nozzle openings 82. The pressurized air flowing into the nozzle assemblies 46 flows into the nozzle bodies 80 and out of the nozzle openings 82.

Each nozzle body 80 is arranged such that nozzle openings 82 thereof are directed at one of the lighting surfaces 22. Accordingly, the pressurized air flowing out of each of the nozzle openings 82 impinges on the associated lighting surface 22 in the form of streams 84 as shown in FIG. 2. The streams 84 of pressurized air at least partly remove debris from the lighting surfaces 22.

II. Second Example

Figure 4:
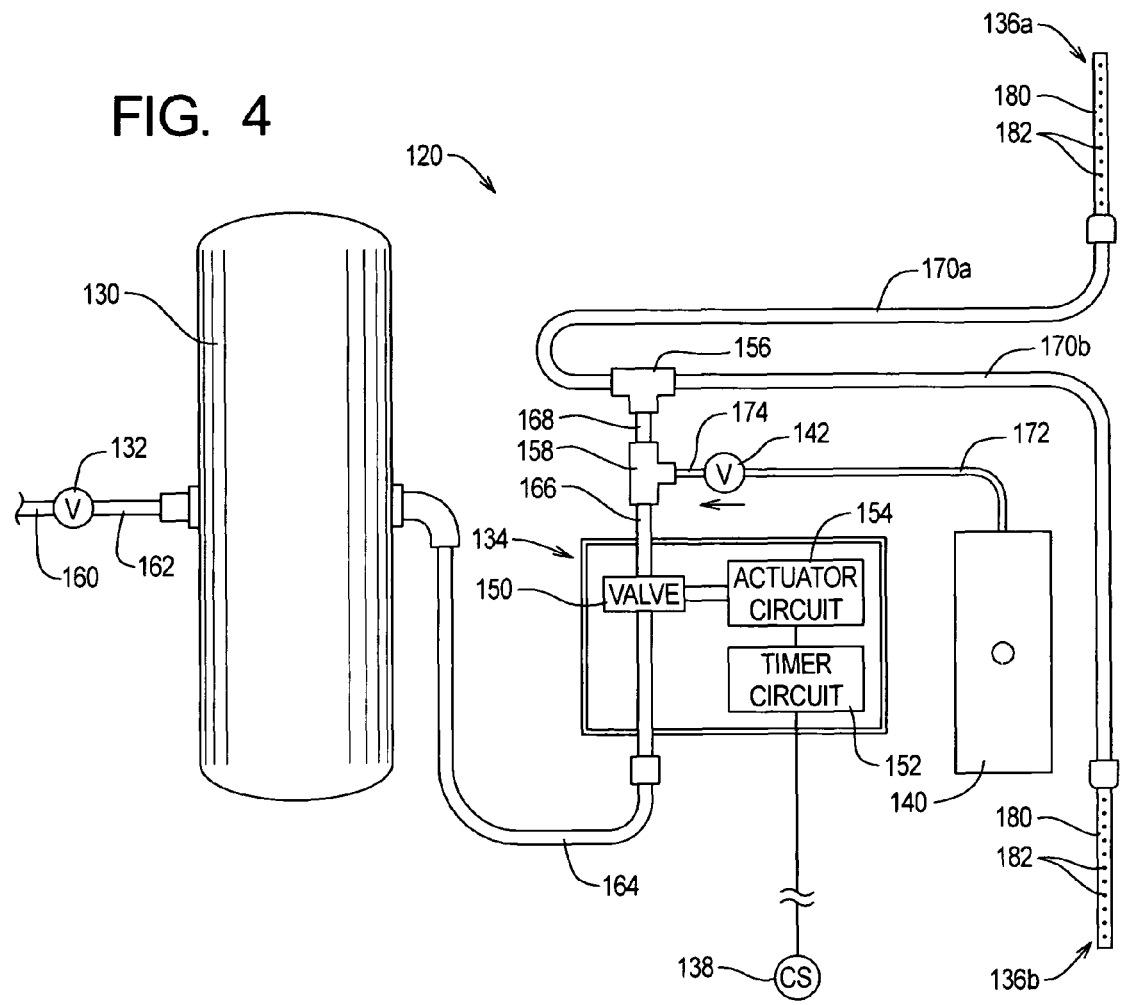
FIG. 4 is a schematic illustration of a second example cleaning system of the present invention.

Referring now to FIG. 4 of the drawing, depicted therein is a second example cleaning system 120 constructed in accordance with, and embodying, the principles of the present invention. Like the first example cleaning system 20, the second example cleaning system 120 is configured to remove foreign substances from the lighting surfaces of a vehicle such as the vehicle 24 described above. The vehicle is or may be conventional and will not be described again.

As shown in FIG. 4, the first example cleaning system 120 comprises an accumulator 130, a bleed valve assembly 132, a control valve assembly 134, first and second nozzle assemblies 136a and 136b, and a control switch 138. The second example cleaning system 120 further comprises a reservoir 140 and a check valve 142. The bleed valve assembly 132 is a regulated valve that defines a predetermined minimum pressure value as will be described in detail below.

The accumulator 130 is operatively connected to the second air tank 34b through the bleed valve assembly 132, while the accumulator 130 is operatively connected to the nozzle assemblies 136a and 136b through the control valve assembly 134. The reservoir 140 is operatively connected to the nozzle assemblies 136a and 136b through the check valve 142. The reservoir 140 stores cleaning liquid, and the check valve 142 is arranged such that the cleaning liquid is allowed to flow only out of the reservoir 140 and pressurized air cannot flow into the reservoir 140.

FIG. 4 also shows that the control valve assembly 134 comprises a valve 150, a timer relay 152, and an actuator 154. The valve 150 is a mechanical component that operates in an OPEN state or a CLOSED state; connected as shown in FIG. 4, the valve 150 allows fluid flow between the accumulator 130 and the nozzle assemblies 136 when in the OPEN state and prevents such fluid flow when in the CLOSED state.

The timer relay 152 is an electrical component that, after a first delay period after receipt of an input signal, generates a timer output signal for a second delay period. In the example cleaning system 120, the duration of the first and second delay periods are settable. In one example, the timer output signal is normally in a LOW state; when the timer relay 152 is triggered by the input signal, the timer relay 152 waits for the first delay period (e.g., 15 minutes) and then causes the timer output signal to go into a HIGH state for a period of time equal to the delay period (e.g., 5 seconds).

The example actuator 154 is an electro-mechanical component that, when connected between the timer relay 152 and the valve 150 as shown in FIG. 4, places the valve 150 in either the OPEN state or the CLOSED state depending upon the state of the timer output signal. In the example described herein, the actuator 154 places the valve 150 in the CLOSED state when the timer output signal is in the LOW state and places the valve 150 in the OPEN state for as long as the timer output signal is in the HIGH state.

FIG. 4 also shows that the control switch 138 is operatively connected to the control valve assembly 134. The position of the control switch 138 determines whether the control valve assembly 134 allows fluid flow from the accumulator 130 to the nozzle assemblies 136. In the example system 120, the control switch 138 is connected to the ignition circuit of the vehicle 24 and thus is on when the ignition circuit is in the ON position.

In particular, after waiting for the first delay period after the leading edge of the pulse is generated by the control switch 138, the timer relay 152 generates the timer output signal in the HIGH state for the second delay period.

FIG. 4 further shows that the control valve assembly 134 is connected to a first T-fitting 156 that allows fluid communication between the actuator 154 and the first and second nozzle assemblies 136a and 136b. The control valve assembly 134 is further operatively connected to a second T-fitting 158 that allows fluid communication between the reservoir 140 and the nozzle assemblies 136a and 136b.

As perhaps best shown with reference to FIG. 4, the example cleaning system 120 comprises a number of conduits to connect the various components described above in a conventional manner. In particular, a first conduit 160 is connected between the air tank 34b and the bleed valve assembly 132. A second conduit 162 is connected between the bleed valve assembly and the accumulator 130. A third conduit 164 is connected between the accumulator 130 and the control valve 150.

A fourth conduit 166 is connected between the control valve 150 and the second T-fitting 158. A fifth conduit 168 is connected between the first T-fitting 156 and the second T-fitting 158. Sixth and seventh conduits 170a and 170b are connected between the first T-fitting 156 and the first and second nozzle assemblies 136a and 136b, respectively. An eighth conduit 172 is connected between the reservoir 140 and the check valve 142, while a ninth conduit 174 is connected between the check valve 142 and the second T-fitting 158.

The conduits 160-174 all are or may be conventional piping with associated fittings, seals, and the like capable of conveying pressurized air as discussed herein. In the example system 120, the first and second conduits 160 and 162 are ¼" lines such as pipes or hoses, while the third conduit 164 is a ¾" line. The fourth, fifth, sixth, and seventh conduits 166, 168, 170a, and 170b are ½" lines such as pipes or hoses. The eighth and ninth conduits 172 and 174 are ¼" lines such as pipes or hoses.

The example cleaning system 120 operates basically as follows. The brake system operates normally when the ignition system is placed in the ON configuration. During normal operation of the brake system, the air tanks fill up with pressurized air. The bleed valve assembly 132 opens to allow air to flow from the second air tank to the accumulator 130 when the air pressure within the air tanks is above a predetermined minimum value. If the pressure of the air within the tanks falls below the predetermined minimum value, the bleed valve assembly 132 closes. In the example system 120, the predetermined minimum pressure value is approximately 80 lbs but in any event is within a range of 80-90 lbs. In addition, the bleed valve assembly 132 and first and second conduits 160 and 162 are sized and dimensioned to allow only a small amount of air flow between the air tank 34b and the accumulator 130.

Once the accumulator 130 is filled with pressurized air, the accumulator 130 stores the pressurized air until operation of the cleaning system 120 is required. To actuate the cleaning system 120, the user activates the control switch 138; in this case, the control switch 138 is operated by turning on the vehicle ignition. The control switch 138 triggers the timer circuit 152, which after the first delay period causes the actuator circuit 154 to open the valve 150 for the second delay period.

When the valve 150 is open, pressurized air flows from the accumulator 130 to the second T-fitting 158 and then to the first T-fitting 156. The pressurized air flowing through the second T-fitting 158 draws fluid out of the reservoir 140 through the check valve 142. The fluid drawn from the reservoir 140 is mixed with the pressurized air in the second T-fitting 158. The mixture of pressurized air and liquid is then carried through the first T-fitting 156 and to the first and second nozzle assemblies 136a and 136b.

Like the nozzle assemblies 46 described above, the nozzle assemblies 136a and 136b each comprise a nozzle body 180 in which are formed a number of nozzle openings 182. The pressurized mixture flowing into the nozzle assemblies 136 flows into the nozzle bodies 180 and out of the nozzle openings 182.

Each nozzle body 180 is arranged such that nozzle openings 182 thereof are directed at one of the lighting surfaces on the vehicle. Accordingly, the pressurized mixture flowing out of each of the nozzle openings 182 impinges on the associated lighting surface 22 in the form of streams similar to those depicted in FIG. 2. The streams of pressurized mixture at least partly remove debris from the lighting surfaces at which the nozzle openings 182 are directed.

III. Third Example

Figure 5:
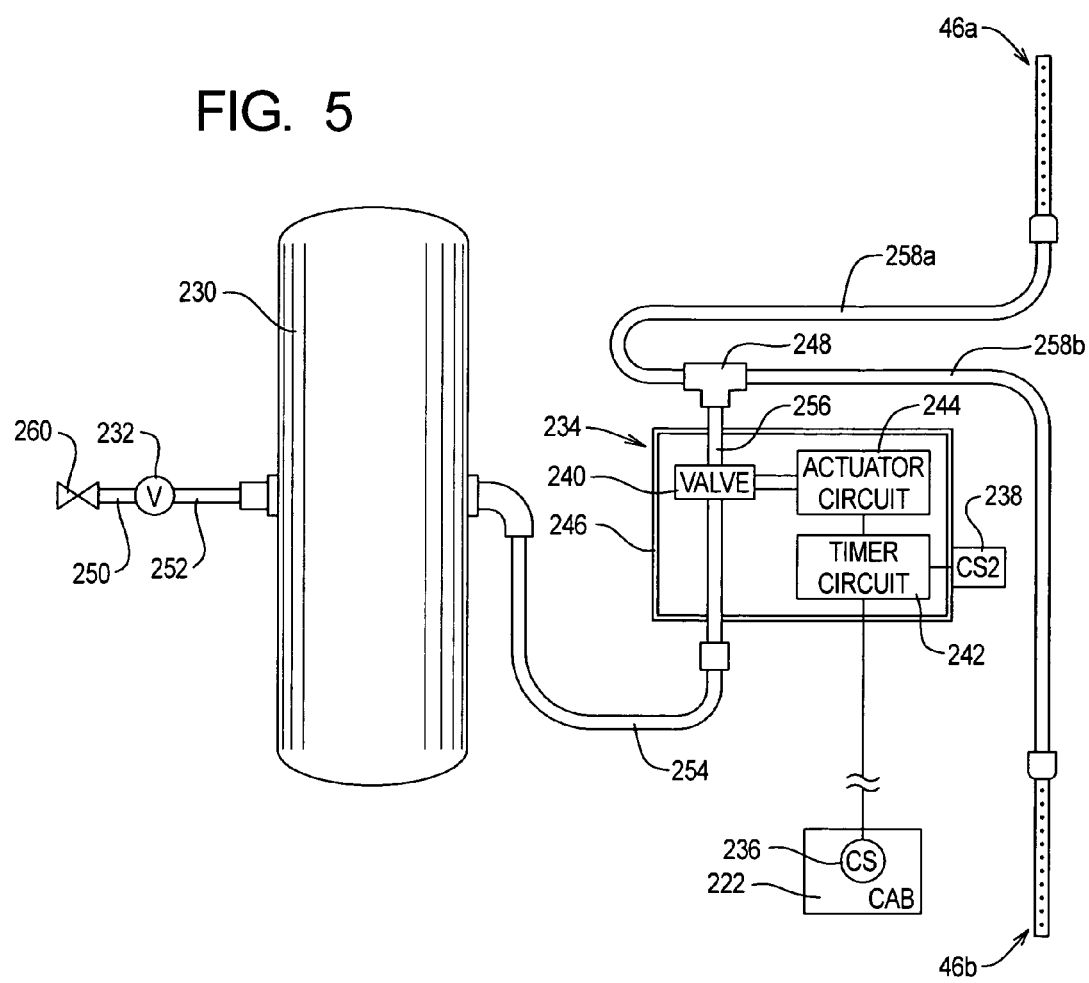
FIG. 5 is a schematic illustration of a third example cleaning system of the present invention.

Referring now to FIG. 5 of the drawing, depicted therein is a third example cleaning system 220 constructed in accordance with, and embodying, the principles of the present invention. Like the first and second example cleaning systems 20 and 120, the third example cleaning system 220 is configured to remove foreign substances from the lighting surfaces of a vehicle such as the vehicle 24 described above. The vehicle is or may be conventional and will not be described again.

FIG. 5 illustrates that the nozzle assemblies 46a and 46b described above may be used as part of the third example cleaning system 220. The example nozzle assemblies 46 will not be described again herein. FIG. 5 further schematically illustrates a cab area 222 of the vehicle on which the cleaning system 220 is mounted.

As shown in FIG. 5, the third example cleaning system 220 comprises an accumulator 230, a bleed valve assembly 232, a control valve assembly 234, a remote control switch 236, and a local control switch 238. The bleed valve assembly 232 is a regulated valve that defines a predetermined minimum pressure value as will be described in detail below. The remote control switch 236 is located in the cab area 222 of the vehicle.

The accumulator 230 is operatively connected to the second air tank 34b through the bleed valve assembly 232, while the accumulator 230 is operatively connected to the nozzle assemblies 46a and 46b through the control valve assembly 234.

FIG. 5 also shows that the control valve assembly 234 comprises a valve 240, a timer relay 242, an actuator 244, a housing 246, and T-fitting 248. The valve 240 is a mechanical component that operates in an OPEN state or a CLOSED state; connected as shown in FIG. 5, the valve 240 allows fluid flow between the accumulator 230 and the nozzle assemblies 46 when in the OPEN state and prevents such fluid flow when in the CLOSED state.

The timer relay 242 is an electrical component that, after a first delay period after receipt of an input signal, generates a timer output signal for a second delay period. In the example cleaning system 220, the duration of the first and second delay periods are settable. In one example, the timer output signal is normally in a LOW state; when the timer relay 242 is triggered by the input signal, the timer relay 242 waits for the first delay period (e.g., 15 minutes) and then causes the timer output signal to go into a HIGH state for a period of time equal to the delay period (e.g., 5 seconds).

The example actuator 244 is an electro-mechanical component that, when connected between the timer relay 242 and the valve 240 as shown in FIG. 5, places the valve 240 in either the OPEN state or the CLOSED state depending upon the state of the timer output signal. In the example described herein, the actuator 244 places the valve 240 in the CLOSED state when the timer output signal is in the LOW state and places the valve 240 in the OPEN state for as long as the timer output signal is in the HIGH state.

FIG. 5 also shows that the remote control switch 236 and the local control switch 238 are operatively connected to the control valve assembly 234. The position of the control switches 236 and 238 determines whether the control valve assembly 234 allows fluid flow from the accumulator 230 to the nozzle assemblies 46.

In the example system 220, the remote control switch 236 is located in the cab area 222 and is connected to the ignition circuit of the vehicle 24 and thus is operative when the ignition circuit is in the ON position. In the example system 220, the local control switch 238 is mounted on the control housing 246. The local control switch 238 is operative whenever the control valve assembly 234 is energized and may be operated by an operator standing near the control housing 246, which will typically be spaced a significant distance from the cab area 222.

Actuation of either the remote control switch 236 or the local control switch 238 causes a pulse to be generated. After waiting for the first delay period after the leading edge of the pulse generated by either the remote control switch 236 or the local control switch 238, the timer relay 242 generates the timer output signal in the HIGH state for the second delay period.

FIG. 5 further shows that the control valve assembly 234 is connected to the T-fitting 248 to allow fluid communication between the actuator 244 and the first and second nozzle assemblies 46a and 46b.

FIG. 5 further illustrates that the example cleaning system 220 comprises a number of conduits to connect the various components described above in a conventional manner. In particular, a first conduit 250 is connected between the air tank 34b and the bleed valve assembly 232. A second conduit 252 is connected between the bleed valve assembly and the accumulator 230. A third conduit 254 is connected between the accumulator 230 and the control valve 240.

A fourth conduit 256 is connected between the control valve 240 and the T-fitting 248. Fifth and sixth conduits 258a and 258b are connected between the T-fitting 248 and the first and second nozzle assemblies 46a and 46b, respectively.

The conduits 250-258 all are or may be conventional piping with associated fittings, seals, and the like capable of conveying pressurized air as discussed herein. In the example system 220, the first and second conduits 250 and 252 are ¼" lines such as pipes or hoses, while the third conduit 254 is a ¾" line. The fourth, fifth, and sixth conduits 256, 258a, and 258b are ½" lines such as pipes or hoses.

The example cleaning system 220 operates basically as follows. The brake system 220 operates normally when the ignition system is placed in the ON configuration. During normal operation of the brake system, the air tanks fill up with pressurized air. A ball valve 260 may be arranged to prevent air flow between the tanks 34b and 230.

The bleed valve assembly 232 opens to allow air to flow from the second air tank to the accumulator 230 when the air pressure within the air tanks is above a predetermined minimum value. If the pressure of the air within the tanks falls below the predetermined minimum value, the bleed valve assembly 232 closes. In the example system 220, the predetermined minimum pressure value is approximately 80 lbs but in any event is within a range of 80-90 lbs. In addition, the bleed valve assembly 232 and first and second conduits 250 and 252 are sized and dimensioned to allow only a small amount of air flow between the air tank 34b and the accumulator 230.

Once the accumulator 230 is filled with pressurized air, the accumulator 230 stores the pressurized air until operation of the cleaning system 220 is required. To actuate the cleaning system 220, the user activates one of the control switches 236 and 238. The remote control switch 236 may be operated simply by turning on the vehicle ignition or may be a discrete switch separate from the ignition system. The local control switch 238 will be independent of the ignition system and will allow an operator standing near the nozzle assemblies 46a and/or 46b to operate the cleaning system 220. In either case, the control switches 236 and/or 238 triggers the timer circuit 242, which after the first delay period causes the actuator circuit 244 to open the valve 240 for the second delay period.

When the valve 240 is open, pressurized air flows from the accumulator 230 to the first T-fitting 248. The pressurized air is then carried through the first T-fitting 248 and to the first and second nozzle assemblies 46a and 46b. The nozzle assemblies 46 operate to clean surfaces to which they are directed as generally described above.

IV. Summary

In the foregoing examples, the example cleaning systems 20, 120 and 220 are arranged to remove foreign substances from a plurality of lighting surfaces associated with rear lights of the vehicle 24. The cleaning systems 20, 120, and 220 can be configured to remove foreign substances from additional lighting surfaces, or a separate cleaning system may be connected to an air tank at another location on the vehicle.

Accordingly, the example cleaning systems 20, 120, and 220 may be configured to remove foreign substances from other light transmitting or reflecting surfaces on the vehicle such as a windshield, headlights, turn signals, and/or rear view mirrors. With any of these lighting surfaces, foreign substances can accumulate on the surface and interfere with light passing through or reflecting off of the surface.

The scope of the present invention should thus be determined by the following claims and not the foregoing detailed description of the invention.

What is claimed is:

1. A cleaning system for a visible surface of a vehicle having a brake system comprising at least one tank of pressurized air, comprising:
   at least one accumulator;
   a bleed valve assembly operatively connected to limit flow of fluid from the at least one tank of pressurized air of the brake system to the at least one accumulator;
   at least one nozzle assembly arranged to direct fluid onto the visible surface; and
   a control valve assembly operatively connected between the at least one accumulator and the at least one nozzle assembly; whereby
   operation of the control valve assembly selectively allows and prevents pressurized air within the accumulator to flow to the at least one nozzle assembly; and
   the bleed valve assembly
      allows the flow of air from the at least one tank of pressurized air of the brake system to the at least one accumulator when a pressure of the air within the at least one tank of pressurized air of the brake system is above a predetermined minimum pressure level; and
      prevents flow of air from the at least one tank of pressurized air of the brake system to the at least one accumulator when the pressure within the at least one tank of pressurized air of the brake system is below the predetermined minimum pressure level.

2. A cleaning system as recited in claim 1, in which the vehicle comprises first and second visible surfaces, wherein:
   the cleaning system comprises first and second nozzle assemblies;
   the first nozzle assembly directs fluids at the first visible surface; and
   the second nozzle assembly directs fluids at the second visible surface.

3. A cleaning system as recited in claim 1, in which the control valve assembly comprises:
   a control valve operable in open and closed configurations;
   an actuator circuit operatively connected to the control valve; and
   a control switch operatively connected to the actuator circuit; whereby
   operation of the control switch causes the actuator circuit to place the control valve in either of the open and closed configurations.

4. A cleaning system as recited in claim 3, in which the control circuit further comprises a timer circuit, where after a first delay period, the timer circuit causes the actuator circuit to place the control valve in the open configuration for a second time period.

5. A cleaning system as recited in claim 3, in which the control circuit further comprises a timer circuit, where the timer circuit periodically causes the actuator circuit to place the control valve in the open configuration.

6. A cleaning system as recited in claim 1, further comprising a reservoir containing a liquid, where the liquid is mixed with the pressurized air flowing to the at least one nozzle assembly.

7. A cleaning system as recited in claim 1, in which the control valve assembly comprises:
   a control valve operable in open and closed configurations;
   an actuator circuit operatively connected to the control valve; and
   first and second control switch operatively connected to the actuator circuit; whereby operation of at least one of the control switches causes the actuator circuit to place the control valve in either of the open and closed configurations; and the first and second control switches are mounted at spaced locations with respect to the vehicle.

8. A cleaning system for a visible surface of a vehicle having a brake system comprising at least one tank of pressurized air, comprising:

at least one accumulator;

a bleed valve assembly operatively connected to limit flow of fluid from the at least one tank of pressurized air of the brake system to the at least one accumulator;

at least one nozzle assembly arranged to direct fluid onto the visible surface; and a control valve assembly, where the control valve assembly comprises a control valve operatively connected between the at least one accumulator and the at least one nozzle assembly, where the control valve is operable in open and closed configurations to allow and prevent, respectively, flow of pressurized air from the at least one accumulator to the at least one nozzle assembly;

an actuator circuit operatively connected to the control valve; and a control switch operatively connected to the actuator circuit; whereby operation of the control switch causes the actuator circuit to place the control valve in either of the open and closed configurations; and the bleed valve assembly allows the flow of air from the at least one tank of pressurized air of the brake system to the at least one accumulator when a pressure of the air within the at least one tank of pressurized air of the brake system is above a predetermined minimum pressure value; and prevents flow of air from the at least one tank of pressurized air to the at least one accumulator when the pressure of air within the at least one tank of pressurized air is below the predetermined minimum pressure value.

9. A cleaning system as recited in claim 8, in which the vehicle comprises first and second visible surfaces, wherein:

the cleaning system comprises first and second nozzle assemblies;

the first nozzle assembly directs fluids at the first visible surface; and the second nozzle assembly directs fluids at the second visible surface.

10. A cleaning system as recited in claim 8, in which the control circuit further comprises a timer circuit, where after a first delay period, the timer circuit causes the actuator circuit to place the control valve in the open configuration for a second time period.

11. A cleaning system as recited in claim 8, in which the control circuit further comprises a timer circuit, where the timer circuit periodically causes the actuator circuit to place the control valve in the open configuration.

12. A cleaning system as recited in claim 8, further comprising a reservoir containing a liquid, where the liquid is mixed with the pressurized air flowing to the at least one nozzle assembly.

13. A cleaning system as recited in claim 8, in which the control valve assembly comprises first and second control switches, wherein:

operation of at least one of the control switches causes the actuator circuit to place the control valve in either of the open and closed configurations; and the first and second control switches are mounted at spaced locations with respect to the vehicle.

* * * * *